United States Patent
Horne

(10) Patent No.: US 7,721,333 B2
(45) Date of Patent: May 18, 2010

(54) METHOD AND SYSTEM FOR DETECTING A KEYLOGGER ON A COMPUTER

(75) Inventor: Jefferson Delk Horne, Boulder, CO (US)

(73) Assignee: Webroot Software, Inc., Boulder, CO (US)

(*) Notice: Subject to any disclaimer, the term of this patent is extended or adjusted under 35 U.S.C. 154(b) by 1157 days.

(21) Appl. No.: 11/334,318

(22) Filed: Jan. 18, 2006

(65) Prior Publication Data

US 2007/0180520 A1 Aug. 2, 2007

(51) Int. Cl.
- G06F 11/00 (2006.01)
- G06F 12/14 (2006.01)
- G06F 12/16 (2006.01)
- G08B 23/00 (2006.01)
- G06F 21/00 (2006.01)
- G06F 11/30 (2006.01)

(52) U.S. Cl. ............... 726/22; 726/23; 726/24; 713/186; 713/188

(58) Field of Classification Search ......... 726/22–24; 713/186, 188
See application file for complete search history.

(56) References Cited

U.S. PATENT DOCUMENTS

| | | | |
|---|---|---|---|
| 5,596,714 A * | 1/1997 | Connell ............... 714/38 |
| 5,623,600 A | 4/1997 | Ji et al. |
| 6,069,628 A | 5/2000 | Farry et al. |
| 6,073,241 A | 6/2000 | Rosenberg et al. |
| 6,092,194 A | 7/2000 | Touboul |
| 6,154,844 A | 11/2000 | Touboul |
| 6,167,520 A | 12/2000 | Touboul |
| 6,310,630 B1 | 10/2001 | Kulkarni et al. |
| 6,397,264 B1 | 5/2002 | Stasnick et al. |
| 6,460,060 B1 | 10/2002 | Maddalozzo, Jr. et al. |
| 6,480,962 B1 | 11/2002 | Touboul |
| 6,535,931 B1 | 3/2003 | Celi, Jr. |
| 6,611,878 B2 | 8/2003 | De Armas et al. |

(Continued)

FOREIGN PATENT DOCUMENTS

WO PCT/2007/067082 11/2007

(Continued)

OTHER PUBLICATIONS

Aslam et al., "Anti-Hook Shield against the Software Key Loggers", Shaheed Zulfikar Ali Bhutto Institute of Science and Technology, National Conference on Emerging Technologies 2004, pp. 189-191.*

(Continued)

*Primary Examiner*—Michael J Simitoski
*Assistant Examiner*—Joshua Watson
(74) *Attorney, Agent, or Firm*—Cooley Godward Kronish LLP

(57) ABSTRACT

A method and system for detecting a keylogger on a computer is described. One illustrative embodiment creates, in a memory of the computer, a hidden window; generates a unique, unpredictable data pattern; inputs, to the hidden window, the unique, unpredictable data pattern in a manner that mimics keyboard input from a user; scans running processes in the memory other than a keylogger detection process for the unique, unpredictable data pattern; and performs a secondary scan of a suspect process, the suspect process having an associated buffer that contains the unique, unpredictable data pattern.

20 Claims, 4 Drawing Sheets

U.S. PATENT DOCUMENTS

| | | | |
|---|---|---|---|
| 6,633,835 B1 | 10/2003 | Moran et al. | |
| 6,667,751 B1 | 12/2003 | Wynn et al. | |
| 6,701,441 B1 | 3/2004 | Balasubramaniam et al. | |
| 6,782,527 B1 * | 8/2004 | Kouznetsov et al. | 717/103 |
| 6,785,732 B1 | 8/2004 | Bates et al. | |
| 6,804,780 B1 | 10/2004 | Touboul | |
| 6,813,711 B1 | 11/2004 | Dimenstein | |
| 6,829,654 B1 | 12/2004 | Jungek | |
| 6,965,968 B1 | 11/2005 | Touboul | |
| 7,058,822 B2 | 6/2006 | Edery et al. | |
| 7,328,457 B1 * | 2/2008 | Mister | 726/30 |
| 2003/0115479 A1 | 6/2003 | Edwards | |
| 2003/0159070 A1 | 8/2003 | Mayer | |
| 2003/0217287 A1 | 11/2003 | Kruglenko | |
| 2004/0030914 A1 | 2/2004 | Kelley et al. | |
| 2004/0034794 A1 | 2/2004 | Mayer et al. | |
| 2004/0064736 A1 * | 4/2004 | Obrecht et al. | 713/201 |
| 2004/0080529 A1 * | 4/2004 | Wojcik | 345/738 |
| 2004/0143763 A1 | 7/2004 | Radatti | |
| 2004/0187023 A1 * | 9/2004 | Alagna et al. | 713/200 |
| 2004/0225877 A1 | 11/2004 | Huang | |
| 2005/0138433 A1 | 6/2005 | Linetsky | |
| 2005/0204165 A1 * | 9/2005 | Nason et al. | 713/201 |
| 2005/0273858 A1 * | 12/2005 | Zadok et al. | 726/24 |
| 2006/0282890 A1 * | 12/2006 | Gruper et al. | 726/22 |

FOREIGN PATENT DOCUMENTS

WO    PCT/US2007/60700    7/2008

OTHER PUBLICATIONS

U.S. Appl. No. 11/334,306, filed Jan. 18, 2006, Jurus Girtakovskis.
Illusive Security, Wolves In Sheep's Clothing: malicious DLLs Injected Into trusted Host Applications, Author Unknown, http://home.arcor.de/scheinsicherheit/dll.htm 13 pgs.
DevX.com, Intercepting Systems API Calls, by Seung-Woo Kim, May 13, 2004, 6 pgs.
Microsoft.com, How to Subclass A Window in Windows 95, Article ID 125680, Jul. 11, 2005, 2 pgs.
MSDN, Win32 Hooks by Kyle Marsh, Jul. 29, 1993, 15 pgs.
PCT Search Report, PCT/US05/34874, Jul. 5, 2006, 7 Pages.
Yi-Min Wang et al.; "Detecting Stealth Software with Strider Ghostbuster" Dependable Systems and Networks, 2005, DSN 2005, Proceedings, International Conference on Yokohama, Japan 28-0 Jun. 2005, Piscatay, NJ, USA, IEE, Jun. 28, 2005; pp. 368-377; XP010817813; ISBN: 0-7695-2282-3.
Codeguru, Three Ways to Inject Your Code Into Another Process, by Robert Kuster, Aug. 4, 2003, 22 pgs.
Codeguru, Managing Low-Level Keyboard Hooks With The Windows API for VB .Net, by Paul Kimmel, Apr. 18, 2004, 10 pgs.
Codeguru, Hooking The Keyboard, by Anoop Thomas, Dec. 13, 2001, 6 pgs.

* cited by examiner

METHOD AND SYSTEM FOR DETECTING A KEYLOGGER ON A COMPUTER

RELATED APPLICATIONS

The present application is related to U.S. application Ser. No. 11/334,306, "Systems and Methods for Neutralizing Unauthorized Attempts to Monitor User Activity," now abandoned, which is herein incorporated by reference in its entirety.

FIELD OF THE INVENTION

The present invention relates generally to the detection of pestware or malware on computers. In particular, but without limitation, the present invention relates to methods and systems for detecting keyloggers.

BACKGROUND OF THE INVENTION

Protecting personal computers from a never-ending onslaught of pestware or malware has become increasingly important and challenging. Some types of pestware or malware can compromise a user's privacy by sending sensitive information about the user or the user's computer to a remote destination without the user's knowledge or permission. Such malware is commonly referred to as "spyware." One particular type of spyware, a "keylogger," secretly records a user's keystrokes as the user types on a keyboard and captures the resulting text in a data file, which is often encrypted. The keylogger may also secretly send the captured data file to a remote destination by e-mail or some other communication protocol. Such a keylogger can be used by a remote party to acquire information such as credit card numbers, social security numbers, and other sensitive information.

Clearly, computer users have a strong motivation to detect and remove unwanted keyloggers from their systems. Many computer users rely on anti-spyware programs to detect and remove such threats. Since keyloggers are usually designed to be difficult to detect, however, conventional anti-spyware programs may fail to detect them quickly and effectively. It is thus apparent that there is a need in the art for an improved method and system for detecting a keylogger on a computer.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

Embodiments of the invention include methods and systems for detecting a keylogger on a computer. One illustrative embodiment is a method comprising creating, in a memory of the computer, a hidden window; generating a unique, unpredictable data pattern; inputting, to the hidden window, the unique, unpredictable data pattern in a manner that mimics keyboard input from a user; scanning running processes in the memory other than a keylogger detection process for the unique, unpredictable data pattern; and performing a secondary scan of a suspect process, the suspect process having an associated buffer that contains the unique, unpredictable data pattern. Another illustrative embodiment is a system to detect a keylogger on a computer. A detection module of the system may be configured to create, in a memory of the computer, a hidden window; generate a unique, unpredictable data pattern; input, to the hidden window, the unique, unpredictable data pattern in a manner that mimics keyboard input from a user; scan running processes in the memory other than a keylogger detection process for the unique, unpredictable data pattern; and perform a secondary scan of a suspect process, the suspect process having an associated buffer that contains the unique, unpredictable data pattern. These and other embodiments are described in more detail herein.

BRIEF DESCRIPTION OF THE DRAWINGS

Various objects and advantages and a more complete understanding of the present invention are apparent and more readily appreciated by reference to the following Detailed Description and to the appended claims, when taken in conjunction with the accompanying Drawings, wherein:

DETAILED DESCRIPTION

A keylogger may be detected quickly and effectively by generating a unique, unpredictable data pattern; inputting the unique, unpredictable data pattern to a hidden window in memory in a manner that mimics keyboard input from a user; scanning data buffers associated with running processes to determine whether any running processes (other than a keylogger detection process) have intercepted the unique, unpredictable data pattern; and performing a secondary scan of any such suspect processes. During the secondary scan of a suspect process, heuristic techniques may be employed to confirm that the suspect process is likely to be a keylogger. For example, it may be determined that the suspect process uses particular application program interfaces (APIs) in a manner that is characteristic of a keylogger.

Figure 1:
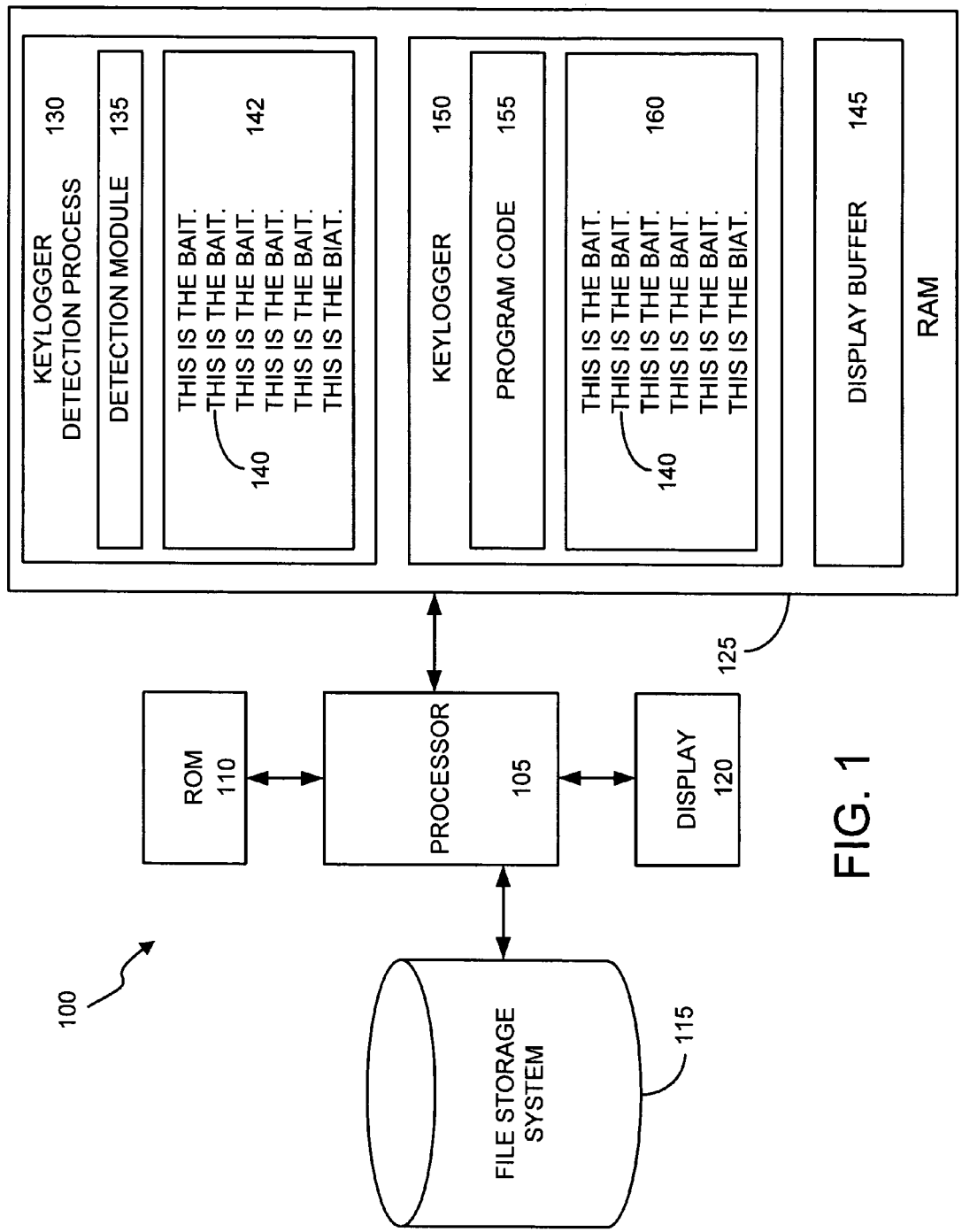
FIG. 1 is a block diagram of a computer protected by a system for detecting a keylogger, in accordance with an illustrative embodiment of the invention.

Referring now to the drawings, where like or similar elements are designated with identical reference numerals throughout the several views, FIG. 1 is a block diagram of a computer 100 protected by a system for detecting a keylogger, in accordance with an illustrative embodiment of the invention. In FIG. 1, processor 105 may communicate with read-only memory (ROM) 110 (e.g., a ROM BIOS), file storage system 115 (e.g., magnetic or optical disk drives), display 120, and random-access memory (RAM) 125. RAM 125 may contain both executable program code and data. In FIG. 1, only relevant running processes and data structures are shown for simplicity. That is, RAM 125 may contain other executing processes and data structures in addition to those shown in FIG. 1.

Among the running processes in RAM 125 is keylogger detection process 130. Keylogger detection process 130 comprises a system for detecting a keylogger on computer 100. In some embodiments, keylogger detection process 130 may be part of a more general anti-spyware detection and removal system. Detection module 135 is an aspect of keylogger detection process 130 that focuses on detecting keyloggers on computer 100 and, optionally, notifying a user that a suspected keylogger has been found. Though shown as a process running on computer 100 in RAM 125 in FIG. 1, keylogger detection process 130 may, in general, be implemented in hardware, firmware, software, or any combination thereof. In one illustrative embodiment, keylogger detection process 130 comprises software that resides on file storage system 115 and that is loaded into RAM 125 and executed by processor 105.

Detection module 135 may be configured to generate a unique, unpredictable data pattern ("data pattern") 140 and to input data pattern 140 to hidden window 142. In FIG. 1, data pattern 140 is shown as the simple string, "THIS IS THE BAIT." As illustrated in FIG. 1, data pattern 140 may be input to hidden window 142 multiple times. In one illustrative embodiment, data pattern 140 may be input to hidden window 142 on the order of 100,000 times. In one embodiment, detection module 135 may generate data pattern 140 by using the current time as a seed to a random number generator. Those skilled in the art will recognize that there are many other ways to generate a string of unique, unpredictable data. For example, multiple pieces of proprietary data and a hashing function may be used to generate data pattern 140.

In one illustrative embodiment, hidden window 142 may be a single-pixel window on display 120 so as not to be noticeable to a user. In that case, hidden window 142 lies within display buffer (video RAM) 145. Despite its tiny size, those skilled in the art will recognize that data pattern 140 may be input to such a single-pixel window in RAM 125. In a different embodiment, detection module 135 may create hidden window 142 entirely outside of display buffer 145 in RAM 120. Regardless of how hidden window 142 is created, detection module 135 may input data pattern 140 to hidden window 142 in a manner that mimics keyboard input from a user. That is, data pattern 140 is input to hidden window 142 in a manner that appears to keylogger 150 to be keyboard input, thereby inducing keylogger 150 to capture it. Those skilled in the art will recognize that there are a variety of ways in which keyboard input may be mimicked. In one illustrative embodiment, detection module 135 may use built-in keyboard extension libraries (APIs) resident in an operating system of computer 100. In another illustrative embodiment, keylogger detection process 130 may include its own integrated keyboard driver for mimicking keyboard input.

Though not shown in FIG. 1, keylogger detection process 130 may include other modules for, e.g., removing discovered keyloggers from computer 100.

Keylogger 150 includes program code 155 and buffer 160. As keylogger 150 intercepts user keystrokes, it records them to buffer 160. Keylogger 150 typically writes the contents of buffer 160 to a data file that resides on data storage system 115. This data file is usually encrypted and, thus, difficult to detect with conventional anti-spyware scanning techniques. When detection module 135 scans buffers associated with running processes such as buffer 160, it detects data pattern 140 in buffer 160 and flags keylogger 150 as a "suspect process" (i.e., one that might be a keylogger). Detection module 135 may then perform a secondary scan to confirm that the suspect process is likely to be a keylogger. At that point, the user may be given the option to remove keylogger 150 from computer 100.

Figure 2:
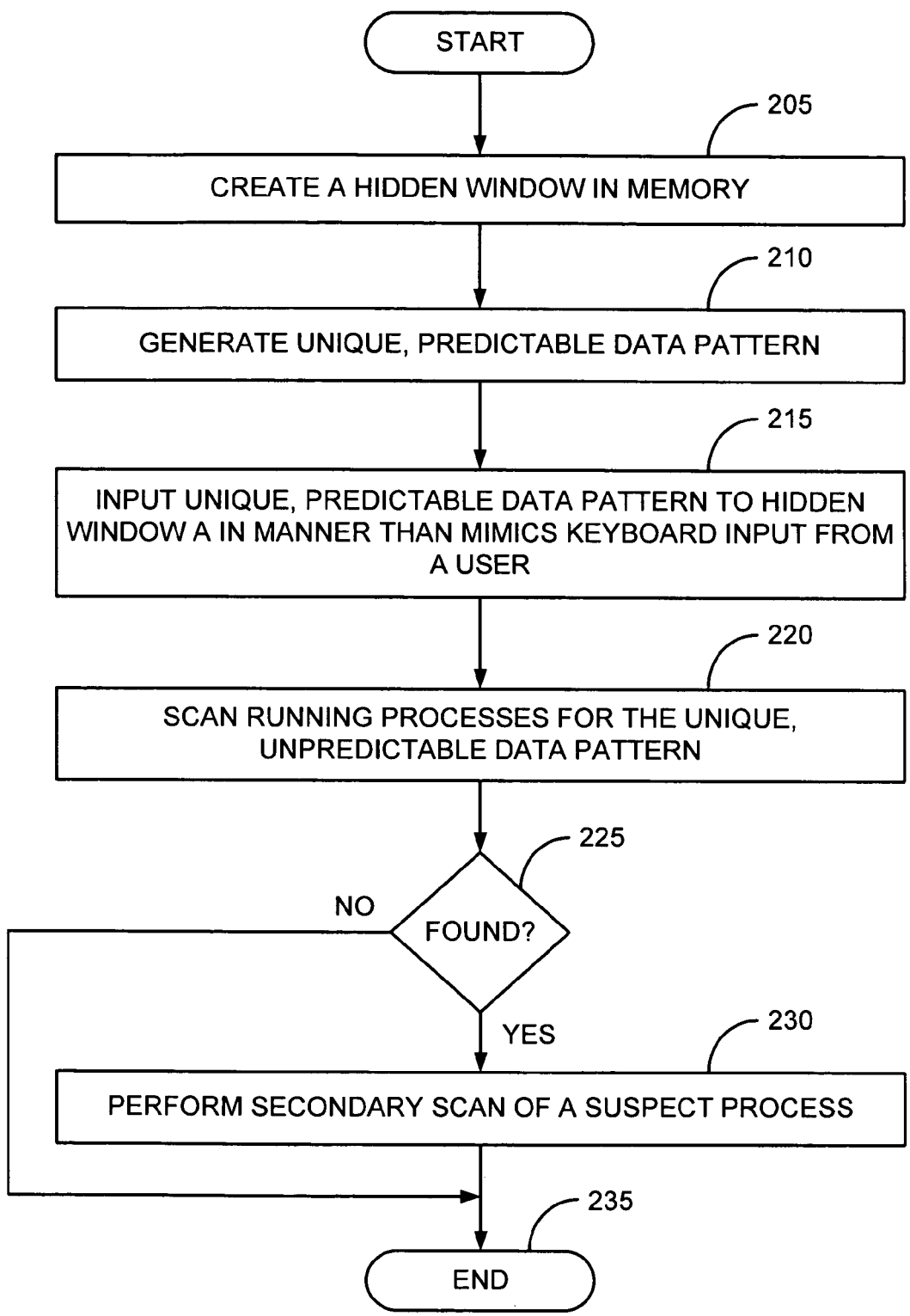
FIG. 2 is a flowchart of a method for detecting a keylogger on a computer, in accordance with an illustrative embodiment of the invention.

FIG. 2 is a flowchart of a method for detecting a keylogger 150 on computer 100, in accordance with an illustrative embodiment of the invention. At 205, detection module 135 may create hidden window 142 in RAM 125, as explained above. Detection module 135 may, at 210, generate data pattern 140 and, at 215, input data pattern 140 to hidden window 142 in a manner that mimics keyboard input from a user. At 220, detection module 135 may scan running processes in RAM 125 to determine whether any associated data buffers contain data pattern 140. If, at 225, data pattern 140 is found in a buffer associated with a process other than keylogger detection process 130, detection module 135 may perform a secondary scan of any such suspect processes at 230. At 235, the process may terminate.

Figure 3:
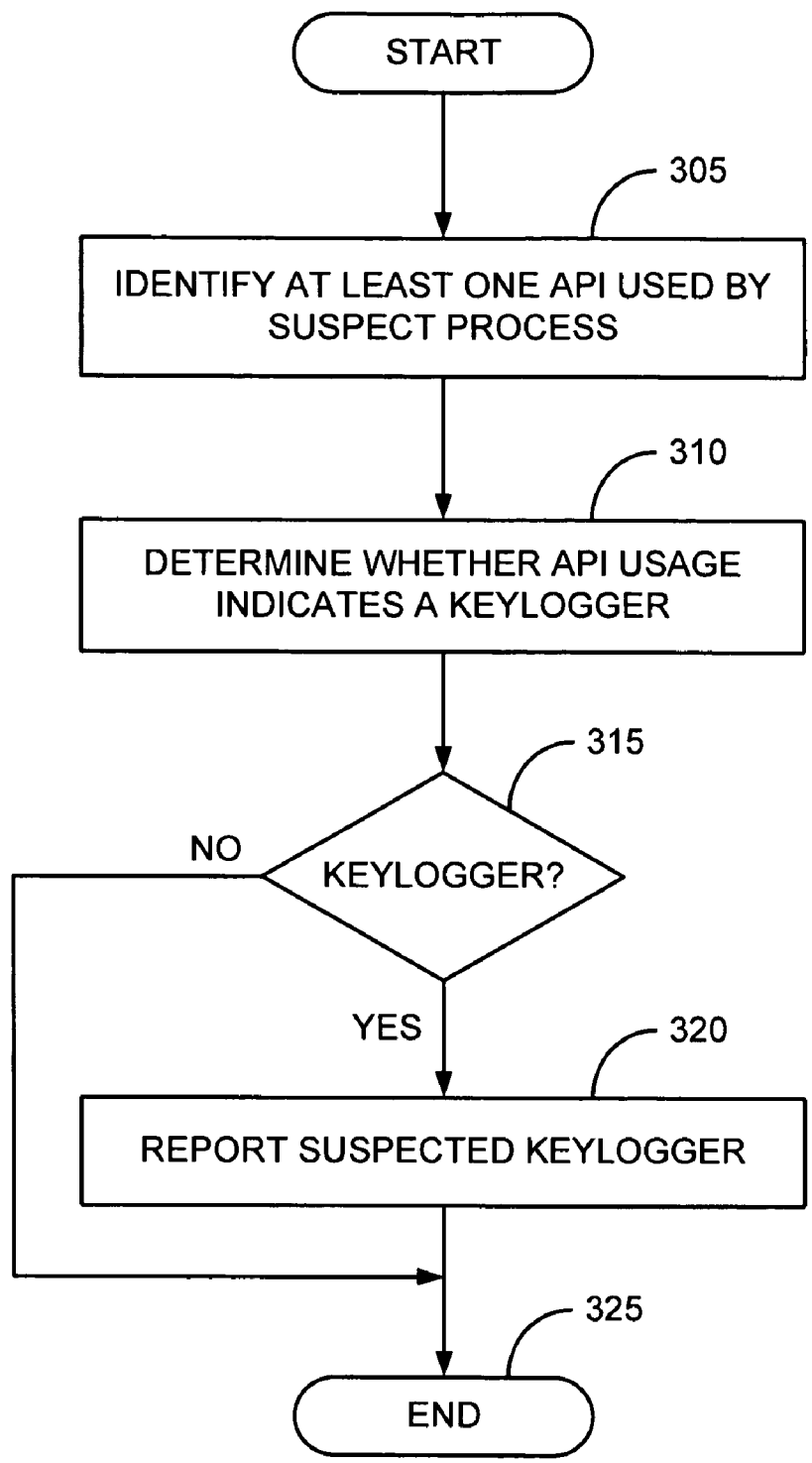
FIG. 3 is a flowchart of a secondary scan to confirm that a suspect process is likely to be a keylogger, in accordance with an illustrative embodiment of the invention.

FIG. 3 is a flowchart of a secondary scan to confirm that a suspect process is likely to be a keylogger 150, in accordance with an illustrative embodiment of the invention (see Step 230 in FIG. 2). The secondary scan shown in FIG. 3 may be helpful in avoiding false positives from keylogger detection process 130. At 305, detection module 135 may identify at least one API used by the suspect process. Since usage of a particular API or set of APIs may be insufficient to confirm that the suspect process is a keylogger 150, detection module 135 may, at 310, scrutinize the manner in which the suspect process uses those APIs. Keyloggers tend to use particular APIs in particular ways that are known to those skilled in the spyware detection art. For example, a suspect process may use a particular API, invoke a dynamic link library (DLL) inside of a system-level application such as a Web browser, and write to a disk file. Thus, heuristic techniques may be developed to confirm that a suspect process is likely to be a keylogger. If detection module 135 determines, at 315, that the suspect process is likely to be a keylogger, detection module may report the suspected keylogger to a user at 320. Even if detection module 135 determines that a suspect process is likely a keylogger 150, keylogger detection process 130 may ask the user to confirm removal of a suspect process. At 325, the process may terminate.

Figure 4A:
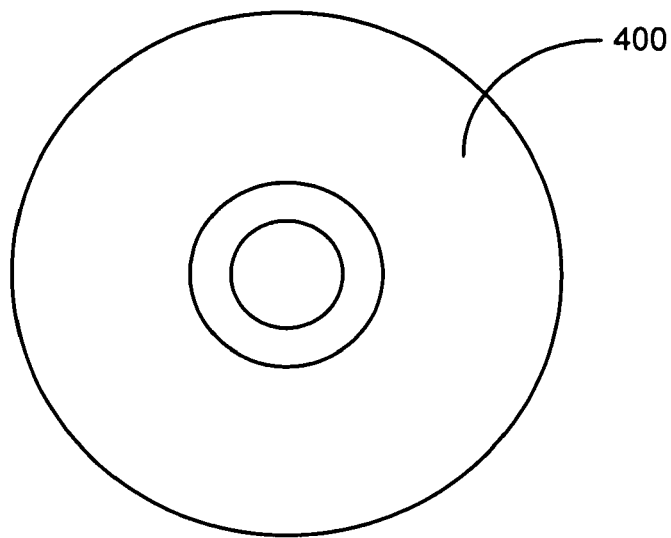
FIG. 4A is an illustration of a computer-readable storage medium, in accordance with an illustrative embodiment of the invention.

FIG. 4A is an illustration of a computer-readable storage medium 400 containing program instructions to detect a keylogger 150 on computer 100, in accordance with an illustrative embodiment of the invention. Though FIG. 4A depicts, by way of illustration, an optical disc such as a CD-ROM, computer-readable storage medium 400 may be any kind of non-volatile, computer-readable storage medium capable of storing program instructions, including, without limitation, flash memory, ROM, optical discs, and magnetic disks.

Figure 4B:
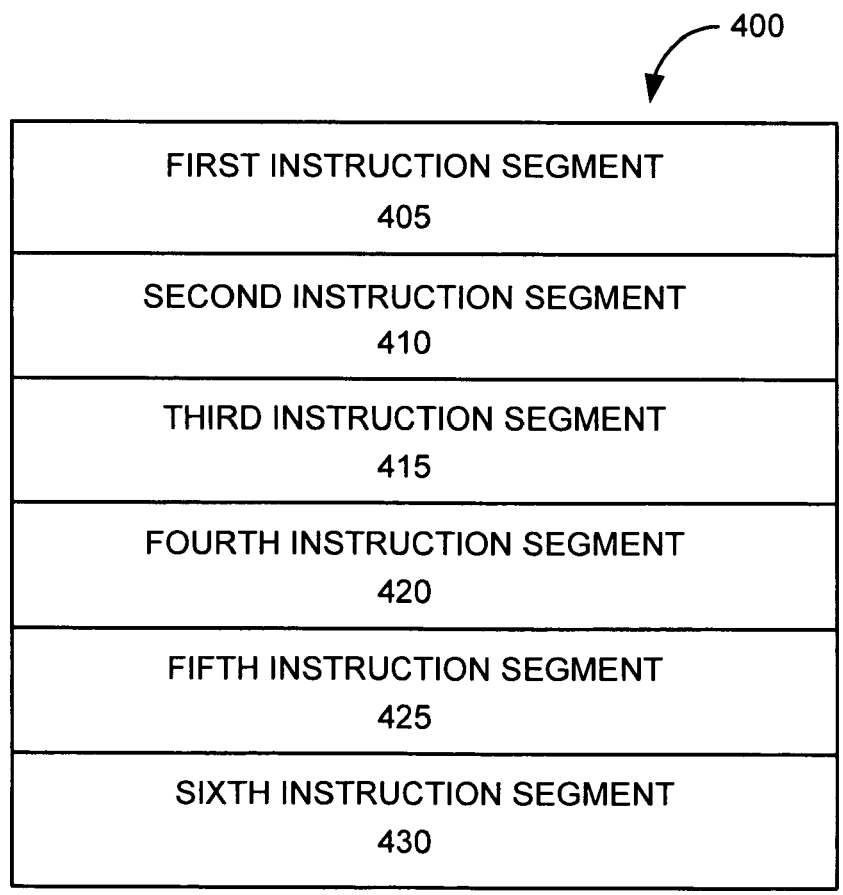
FIG. 4B is a diagram of the elements of a computer-readable storage medium, in accordance with an illustrative embodiment of the invention.

FIG. 4B is a diagram of the elements of a computer-readable storage medium 400 containing program instructions to detect a keylogger 150 on computer 100, in accordance with an illustrative embodiment of the invention. Computer-readable storage medium 400 may comprise a first instruction segment 405 that creates, in a memory of the computer (e.g., RAM 125), a hidden window 142; a second instruction segment 410 that generates a unique, unpredictable data pattern (data pattern 140); a third instruction segment 415 that inputs, to the hidden window 142, data pattern 140 in a manner that mimics keyboard input from a user; a fourth instruction segment 420 that scans running processes in the memory (other than keylogger detection process 130) for data pattern 140; and a fifth instruction segment 425 that performs a secondary scan of a suspect process, the suspect process having an associated buffer that contains data pattern 140. Optionally, computer-readable storage medium 400 may further comprise a sixth instruction segment 430 that reports the suspect process as a suspected keylogger, when the secondary scan confirms that the suspect process is likely to be a keylogger (see FIG. 3).

In conclusion, the present invention provides, among other things, a method and system for detecting a keylogger on a computer. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for detecting a keylogger on a computer, comprising:
   creating, in a memory of the computer, a hidden window;
   generating a unique, unpredictable data pattern;
   inputting, to the hidden window, the unique, unpredictable data pattern in a manner that mimics keyboard input from a user;
   scanning running processes in the memory other than a keylogger detection process for the unique, unpredictable data pattern; and
   performing a secondary scan of a suspect process, the suspect process having an associated buffer that contains the unique, unpredictable data pattern.

2. The method of claim 1, further comprising reporting the suspect process as a suspected keylogger, when the secondary scan confirms that the suspect process is likely to be a keylogger.

3. The method of claim 1, wherein the hidden window comprises a single-pixel window on a display of the computer.

4. The method of claim 1, wherein the hidden window is created outside of a display buffer of the computer.

5. The method of claim 1, wherein the unique, unpredictable data pattern is based on a random value.

6. The method of claim 1, wherein the unique, unpredictable data pattern is input to the hidden window multiple times.

7. The method of claim 1, wherein inputting, to the hidden window, the unique, unpredictable data pattern in a manner that mimics keyboard input from a user comprises using an application program interface (API) of an operating system of the computer.

8. The method of claim 1, wherein inputting, to the hidden window, the unique, unpredictable data pattern in a manner that mimics keyboard input from a user comprises using a keyboard driver that is integral to the keylogger detection process.

9. The method of claim 1, wherein performing the secondary scan of the suspect process comprises:
   identifying at least one application program interface (API) used by the suspect process; and
   determining whether the suspect process uses the at least one API in a manner that is characteristic of a keylogger.

10. A system, comprising:
    a processor; and
    a memory connected with the processor, the memory containing a plurality of program instructions to detect a keylogger on a computer, the plurality of program instructions being configured to cause the processor to:
    create, in the memory, a hidden window;
    generate a unique, unpredictable data pattern;
    input, to the hidden window, the unique, unpredictable data pattern in a manner that mimics keyboard input from a user;
    scan running processes in the memory other than a keylogger detection process for the unique, unpredictable data pattern; and
    perform a secondary scan of a suspect process, the suspect process having an associated buffer that contains the unique, unpredictable data pattern.

11. The system of claim 10, wherein the plurality of program instructions are further configured to cause the processor to report the suspect process as a suspected keylogger, when the secondary scan confirms that the suspect process is likely to be a keylogger.

12. The system of claim 10, wherein the hidden window comprises a single-pixel window on a display of the computer.

13. The system of claim 10, wherein the plurality of program instructions are configured to cause the processor to create the hidden window outside of a display buffer of the computer.

14. The system of claim 10, wherein the unique, unpredictable data pattern is based on a random value.

15. The system of claim 10, wherein the plurality of program instructions are configured to cause the processor to input the unique, unpredictable data pattern to the hidden window multiple times.

16. The system of claim 10, wherein the plurality of program instructions are configured to cause the processor to input, to the hidden window, the unique, unpredictable data pattern in a manner that mimics keyboard input from a user by using an application program interface (API) of an operating system of the computer.

17. The system of claim 10, wherein the plurality of program instructions are configured to cause the processor to input, to the hidden window, the unique, unpredictable data pattern in a manner that mimics keyboard input from a user by using a keyboard driver that is integral to the keylogger detection process.

18. The system of claim 10, wherein, during the secondary scan of the suspect process, the plurality of program instructions are configured to cause the processor to:
    identify at least one application program interface (API) used by the suspect process; and
    determine whether the suspect process uses the at least one API in a manner that is characteristic of a keylogger.

19. A computer-readable storage medium containing program instructions to detect a keylogger on a computer, comprising:
    a first instruction segment to create, in a memory of the computer, a hidden window;
    a second instruction segment to generate a unique, unpredictable data pattern;
    a third instruction segment to input, to the hidden window, the unique, unpredictable data pattern in a manner that mimics keyboard input from a user;
    a fourth instruction segment to scan running processes in the memory other than a keylogger detection process for the unique, unpredictable data pattern; and
    a fifth instruction segment to perform a secondary scan of a suspect process, the suspect process having an associated buffer that contains the unique, unpredictable data pattern.

20. The computer-readable storage medium of claim 19, further comprising a sixth instruction segment to report the suspect process as a suspected keylogger, when the secondary scan confirms that the suspect process is likely to be a keylogger.

* * * * *